United States Patent
Lindner et al.

(10) Patent No.: US 9,346,579 B2
(45) Date of Patent: May 24, 2016

(54) METHOD FOR DETERMINING THE INTEGRITY AND LEAK TIGHTNESS OF CONTAINERS IN FILLING LINES

(75) Inventors: Peter Lindner, Langquaid (DE); Rudolf Fiegler, Regensburg (DE); Thorsten Gut, Neutraubling (DE); Sophie Pröll, Pfatter (DE); Dieter Leykamm, Neutraubling (DE)

(73) Assignee: KRONES AG, Neutraubling (DE)

( * ) Notice: Subject to any disclaimer, the term of this patent is extended or adjusted under 35 U.S.C. 154(b) by 251 days.

(21) Appl. No.: 14/128,577

(22) PCT Filed: May 24, 2012

(86) PCT No.: PCT/EP2012/059727
§ 371 (c)(1),
(2), (4) Date: Jan. 15, 2014

(87) PCT Pub. No.: WO2013/004432
PCT Pub. Date: Jan. 10, 2013

(65) Prior Publication Data
US 2014/0144103 A1 May 29, 2014

(30) Foreign Application Priority Data
Jul. 6, 2011 (DE) .......................... 10 2011 106 832

(51) Int. Cl.
*B65B 57/00* (2006.01)
*B67C 3/00* (2006.01)
(Continued)

(52) U.S. Cl.
CPC ................ *B65B 57/00* (2013.01); *B07C 5/3408* (2013.01); *B67C 3/007* (2013.01); *G01M 3/3263* (2013.01)

(58) Field of Classification Search
CPC ....... B07C 5/3408; B67C 3/007; G01F 17/00; G01M 3/3209; G01M 3/3236; G01M 3/3263; G01M 3/36; G01M 3/00; G01N 21/9054; G01N 2291/014; G01N 2291/02433; G01N 29/036; G01N 29/28
See application file for complete search history.

(56) References Cited

U.S. PATENT DOCUMENTS 2,339,639 A * 1/1944 Henszey ................. G01M 3/36
73/45.4
3,012,665 A 12/1961 Hanot et al.
(Continued)

FOREIGN PATENT DOCUMENTS

DE 2422526 A1 11/1975
DE 4136472 A1 5/1993
(Continued)

OTHER PUBLICATIONS

International Search Report for Application No. PCT/EP2012/059727, dated Sep. 19, 2012.

*Primary Examiner* — Daniel S Larkin
*Assistant Examiner* — Jamar Ray
(74) *Attorney, Agent, or Firm* — Marshall, Gerstein & Borun LLP

(57) ABSTRACT

The invention relates to a method for determining the intactness and leaktightness of containers (4) that are processed in a filling plant, wherein the filling plant comprises at least one centering head (2) for holding, gripping and/or turning one of the containers (4), wherein the centering head (2) is arranged movably along a longitudinal axis (3) of the container (4), and wherein the relative position of the centering head (2) on the longitudinal axis (3) is determined and used for the intactness and leaktightness determination.

19 Claims, 1 Drawing Sheet

(51) Int. Cl.
  *B07C 5/34* (2006.01)
  *G01M 3/32* (2006.01)

(56) References Cited

U.S. PATENT DOCUMENTS

| | | | |
|---|---|---|---|
| 3,866,753 A | 2/1975 | Milton | |
| 5,309,750 A * | 5/1994 | Riley | G01M 3/3218 |
| | | | 73/49.3 |
| 5,319,957 A | 6/1994 | Stieger et al. | |
| 8,578,760 B2 * | 11/2013 | Calhoun | G01M 3/32 |
| | | | 73/49.3 |

FOREIGN PATENT DOCUMENTS

| | | |
|---|---|---|
| DE | 4239238 A1 | 5/1994 |
| DE | 4332461 A1 | 8/1994 |
| DE | 2005009918 B4 | 9/2006 |
| DE | 102006054290 A1 | 5/2007 |
| DE | 102008052634 A1 | 5/2010 |
| DE | 102009005181 A1 | 7/2010 |
| DE | 102009025907 A1 | 12/2010 |
| EP | 0821230 A2 | 1/1998 |
| EP | 0894544 A2 | 2/1999 |
| JP | 59120934 A | 7/1984 |
| WO | WO-2005124308 A2 | 12/2005 |

* cited by examiner

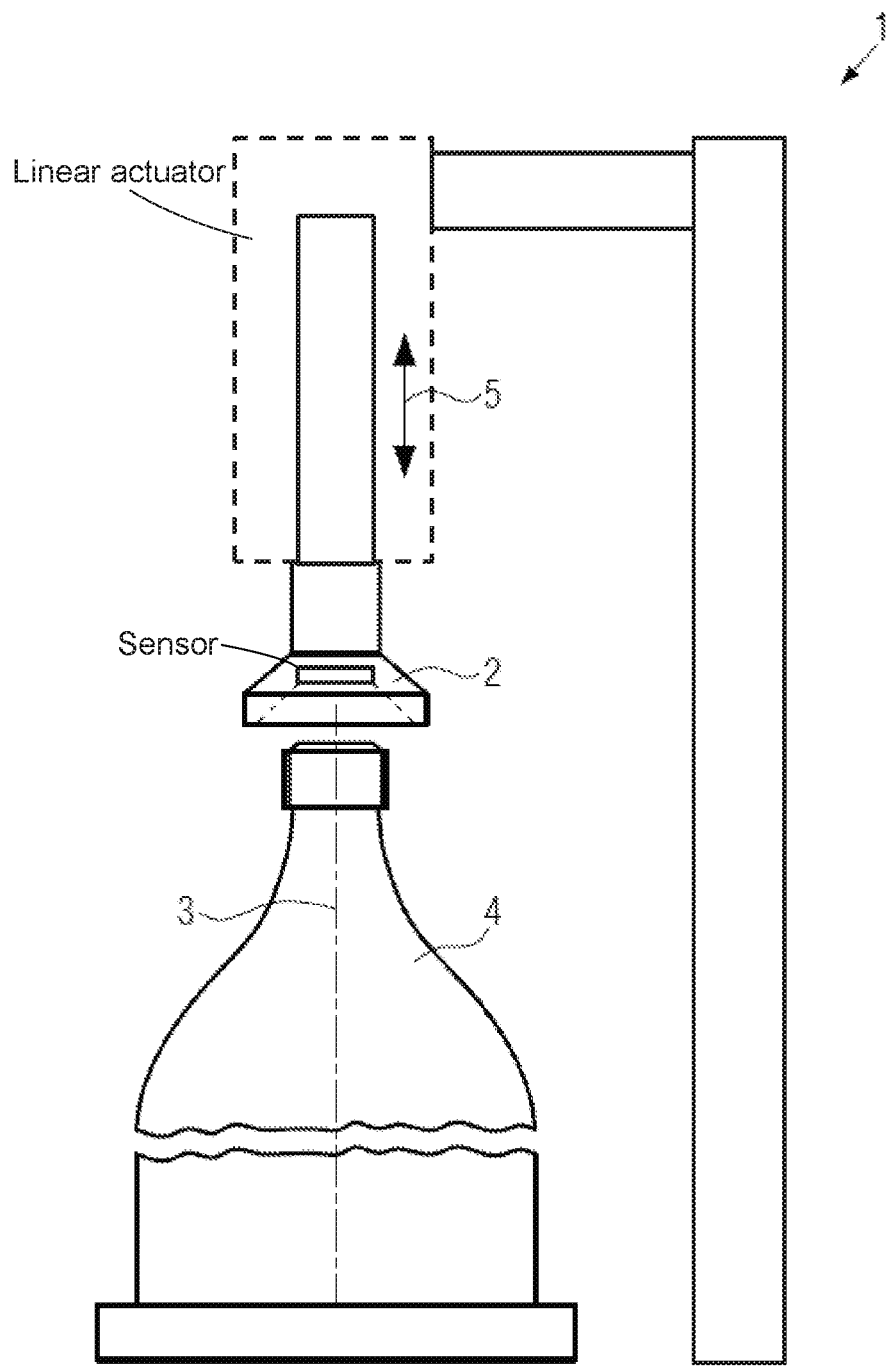

METHOD FOR DETERMINING THE INTEGRITY AND LEAK TIGHTNESS OF CONTAINERS IN FILLING LINES

CROSS-REFERENCE TO RELATED APPLICATION

The present application is the United States national phase of International Patent Application No. PCT/EP2012/059727, filed May 24, 2012, which application claims priority of German Application No. 102011106832.9, filed Jul. 6, 2011. The priority application, DE 102011106832.9, is incorporated herein by reference.

FIELD OF THE DISCLOSURE

The invention relates to a method for determining the integrity and leak tightness of containers that are processed in a filling line, where the filling line comprises at least one centering head for holding, gripping and/or turning one of the containers, where the centering head is arranged movably along a longitudinal axis of the container.

Devices and methods processing containers are known from prior art, for example, DE 10 2009 025907 A1. DE 10 2009 0259 07 A1 discloses a container processing device having at least one mounting device adjustable in the vertical direction for holding, gripping and/or turning containers standing on a support at the upper neck finishes and/or at the neck areas, where the device comprises a double-acting linear actuator and at least one force and/or displacement sensor for recording an actuating and/or holding force of the linear actuator and/or a current location of the holding device. A double-acting linear actuator is in this publication understood to be a double-acting pneumatic cylinder or hydraulic cylinder cooperating with a centering head, also referred to as a holding bell, such that it is adjustable in the vertical direction, for example, via a rotatable actuator. DE 10 2009 0259 07 A1 requires no curve or cam guides for mechanically forced control of a holding device for the containers, for example, for bottles.

Such devices and methods are usually used in filling lines, where such filling lines also include individual components, such as labeler, filler, testing facilities and closure devices.

Different types of centering heads or holding bells are known, for example from DE 10 2009 0051 81 A1 in which a container processing machine is likewise disclosed detailing a gripper. This container processing machine is used for processing containers, in particular, a labeling machine with a rotor drivable revolving around a vertical machine axis and having a plurality of processing positions that each comprise at least a container carrier as well as a clamping and/or centering unit is [sic], which are movable in a controlled manner in a controlled lifting motion between an initial position and a position centering and/or clamping the respective container. A gripper head 7 gripping a bottle is configured having a clamp-fit design, where two members are rotatable about a vertical axis relative to each other such that the gripper head engages with the closure at the neck of a bottle.

DE 2422526 discloses a method and a device for verifying the leak tightness of filled and sealed containers, where in particular bottles are examined. A conclusion is drawn about the leak tightness and integrity of the bottle from a defined squeezing of the bottle, followed by level measurement and an indentation distance measurement.

A different approach is disclosed in DE 4136472 C2, which relates to a method for determining the leak tightness of containers such as bottles, cans, drums, or the like, where these containers are filled with beverages that are added gas, such as juices, cola, beer, sodas, or the like and sealed or closed with a suitable closure. In a water bath, the liquid of the containers is oscillated, such as in the sense of shaking. In this manner, release of carbon dioxide from the liquid is forced. If the closure leaks, then this leads to leakage of the gas and part of the beverage from the container, for example from a bottle, so that the containers subsequently further conveyed by a conveyor when passing a detection station are identified as no longer being completely filled. Such a detection station can comprise a gamma-head.

DE 2005 009 918 B4 presses into a filled or fillable container using a spring-loaded sensing finger in order to be able to determine the displacement of the sensing finger and therefrom draw conclusions about the leak tightness.

A completely different approach is disclosed in EP 0821230 B1, which uses ultrasonic measurement of a beverage containing gas under pressure to verify the leak tightness of a closure of this container.

SUMMARY OF THE DISCLOSURE

It is the object of the present invention to verify, firstly, the integrity, and secondly, the leak tightness of containers in a particularly cost-effective and efficient manner.

This object is satisfied according to the invention in that the relative position of the centering head on the longitudinal axis is determined and used for verifying the integrity and leak tightness.

In this way, closure errors or even bottles fractures, in particular, when using glass bottles, can be determined when the containers are used in this manner in the filling line. It can also be determined for PET bottles by detecting the bear-on pressure, whether they are significantly underfilled and therefore buckle under load When the centering bell moves onto the container, it assumes a certain position. If the bottle is damaged, such as fractured glass bottle, the centering head moves downwardly, i.e. along the longitudinal axis of the container further away from a point of origin, whereby a lack of integrity can be determined. Even with materials other than glass, the integrity and leak tightness can be verified for containers in the form of bottles. If the bottle is not sealed in an air-tight manner, either due to a closure error or a hole in the bottle, or is otherwise significantly underfilled, then the position of the centering head changes on the longitudinal axis, because the position must continuously be followed since the bottle "buckles" under a constant force in a carousel connected to the centering head. This can be seen clearly, in particular at the curves.

It is of advantage when the centering head bears upon the container at a defined force, so that a gas, e.g. $CO_2$, contained in a liquid contained in the container is released and increases the internal pressure of the container, or the container is further conveyed in a shaking manner in order to achieve a resonance in the liquid it contains. The centering head, which can also be referred to as a centering bell, can with a defined force bear down hard, optionally with the aid of a backswing, onto on an upper edge of the bottle in order to release $CO_2$. It is then monitored whether this $CO_2$ escapes. Such specific bearing-down by centering heads or centering bells in container processing machines can also be realized, for example, within the framework of a labeling machine. After bearing down with a blow, $CO_2$ is released from the liquid contained in the container and increases the pressure therein, which counteracts the electric drive. The moment arising can be monitored over a certain period of time and/or a certain distance. If pressure does not build up or only insufficiently, then the container is to be assessed as leaking. Of course, a full pressure curve can be simulated with the drive. A specific pressure curve presently means that after excitation of the container, if this is at all necessary, slowly increasing pressure is to be observed. If the leak in the container is relatively small, then, after a rise in pressure, decrease of the latter is recorded, this pressure curve can be evaluated relatively easily with conventional evaluation methods. Parameters that can be evaluated are the rate of pressure increase, the maximum achievable pressure after a certain time, the holding force, the pressure drop as well as a gradient in the degree of the pressure curve.

The specific hard bearing-down by the centering heads can be used as excitation for increasing pressure, at least for beverages containing $CO_2$, where alternatively a specific "shaking-up" can be enabled by a container plate drive, such as a bottle plate drive, where a resonance provokes similar behavior. No further measures are necessary besides control technology specifically geared theretowards, which leads to a simplification of filling lines. Alternatively, it is also possible to induce an increase in pressure in the container by force impact using other means, for example, directly using a contact element or indirectly, for example, using compressed air.

A further advantageous embodiment is characterized in that the relative position of the centering head on the longitudinal axis is repeatedly determined during transport of the container. In this manner, the relative position of the centering head on the longitudinal axis is determined over a certain distance or a certain time and can be used for verifying integrity and leak tightness. In this regard, the use of a processor is advantageous which further processes the respective signals.

It is also advantageous if the relative position is detected continuously, as the necessary information is then available at any time and for every waypoint. Furthermore, it is advantageous if the relative position of the centering head on the longitudinal axis is used in dependency of a fixed plane to determine the absolute height of the centering head above the fixed plane. In this manner, additional influences acting upon the container, such as a bottle, can be taken into account.

A further embodiment is characterized in that conclusions are drawn from the relative position or the absolute height about the pressure increase in the container, the maximum possible reachable pressure in the container, the holding force of the centering bell, the pressure drop in the container and/or the gradient of the pressure change in the container.

When the centering head is moved by a preferably position-controlled linear actuator, a force measuring element can also be integrated in a simple manner. Special other types of force or distance sensors and their combination have proven to be advantageous, such as rack drives driven by an electric motor or spring-preloaded centering heads with displacement sensors.

If, in addition or in alternative to the determination of the relative position of the centering head, a measurement information of a sensor contained in the centering head and being in operative contact with the container is used, then different and/or more accurate measurement can be achieved. For example, pressure measurement can be used when the sensor is designed as a pressure sensor, such as in the kind of a piezoelectric pressure sensor. Such a pressure test can be performed within a processing machine with a clamping device via a load cell. In order to prevent mechanical damage, the centering head is designed such that it contacts the outer edge of a container closure in an air-tight manner. The centering head is designed as a cavity, where the load cell is located in this cavity and records the pressure profile when the container is excited. This load cell, also referred to as a sensor cell, can also be located elsewhere, for example, the air space of the centering element must then only be extended by an air hose. Basically, a level switch design is also possible like it is used in lifting units, washing machines or dishwashers. Especially piezo-electric pressure sensors have advantages due to their positive-fit connection. However, they should be decoupled by a pressure spring from the mechanical influences, in which case the air space mentioned can be dispensed with.

It is also advantageous if the sensor is designed as a positive-fit and/or displacement sensor. Such a displacement sensor is advantageously designed as a force element and does not necessarily have to be integrated into the centering head. A force sensor, such as a load cell, can just as well be located in the transport device, such as the bottle plate. At a constant centering head tension, expansion of the container in the downward direction is likewise detected, where the integrity and leak tightness, respectively, can now be determined via this detour.

BRIEF DESCRIPTION OF THE DRAWING

The drawing FIGURE shows a device with which the method according to the invention can be performed, in that the FIGURE provides a schematic representation of a container processing device used for this.

DETAILED DESCRIPTION OF THE PREFERRED EMBODIMENTS

The container processing device 1 is part of a filling line and comprises a centering head 2 which is movable along a longitudinal axis 3 of a container 4. The direction of displacement is visualized by arrow 5.

The longitudinal axis 3 is an axis of rotational symmetry of the container 4. The container 4 is formed as a bottle, in particular a glass bottle or a PET bottle. The centering head 2 is movable with a linear drive unit—not shown—in its relative position along the longitudinal axis 3 of the container 4.

A major problem with the current filling lines is determining the filling level or more accurately determining the content in containers 4 made of plastic. Due to different pressure conditions when filling non-carbonated products, products containing $CO_2$ or nitrogen into respective containers 4, the dimensions of such containers 4 are not always the same. Determining the filling level using conventional filling level detectors does not necessarily yield the result, since the filling level in the container fluctuates. Determining the weight of the container with a closure, in particular after subtraction of the weight of the closure, the preform weight, and possibly a label, however, does not allow determining the content. Such considerations previously always failed because container processing with single-lane devices and extremely short integration times for an employed load cell, approximately 60 milliseconds per container, did not allow this. This is worsened by the fact that a certain measurement time must elapse in which the container can settle, which approximately halves the measurement period.

The pressing force of the centering bell can be determined with the method according to the invention, so that the total container weight can be determined via a load cell in the bottle plate. After subtraction of the holding force and the equipment, the product weight is determined. Temporal relaxation is to be noted because a "virtual" machine clock is created, namely in each bottle plate, due to the plurality of load cells.

The container flow usually also has different container heights that are recognized at the inlet of a processing machine with an appropriate inspection module, so that the centering heads can be clamped on matching the currently incoming container height. Different container heights, in particular different bottles in terms of their height, can thereby be equipped with different labels, and they can be moved separately to the packing machine.

A sorting function can also be solved therewith. If there are different bottle colors in the flow of containers, then this can be detected in the inspection module and the respective information can be supplied to a processing mode for enabling unmixed further conveyance.

What is claimed is:

1. Method for determining integrity and leak tightness of containers that are processed in a filling line, where said filling line comprises at least one centering head for at least one of holding, gripping or turning one of said containers, comprising moving the centering head along a longitudinal axis of said container, bearing the centering head upon said container at a defined force, releasing a gas contained in a liquid within said container and increasing an internal pressure of said container, determining a relative position of said centering head on said longitudinal axis, and using the relative position of the centering head to determine integrity and leak tightness.

2. Method according to claim 1, and repeatedly determining the relative position of the centering head on the longitudinal axis during transport of the container.

3. Method according to claim 2, and recording relative position of centering head on said longitudinal axis.

4. Method according to claim 1 and using the relative position of the centering head on the longitudinal axis in dependency of a fixed plane to determine an absolute height of the centering head above the fixed plane.

5. Method according to claim 1, and drawing one or more conclusions from one of the relative position or an absolute height about at least one of the pressure increase in the container, the maximum possible reachable pressure in the container, the holding force of the centering head, the pressure drop in the container or the gradient of the pressure change in the container.

6. Method according to claim 1, and moving the centering head by a linear actuator.

7. Method according to claim 6, and in moving the centering head, the linear actuator is position controlled.

8. Method according to claim 1, and measuring information of a sensor contained in the centering head and in operative contact with the container.

9. Method according to claim 8, and in measuring information of the sensor, the sensor is designed as a pressure sensor.

10. Method according to claim 9, and in measuring information of the sensor, the sensor is a piezo-electric pressure sensor.

11. Method according to claim 9, wherein the pressure sensor comprises a piezo-electric pressure sensor.

12. Method according to claim 8, and in measuring information of the sensor, the sensor is at least one of a group including a positive-fit sensor and a displacement sensor.

13. Method according to claim 1, and further conveying the container in a shaking manner at least until a resonance in said liquid is achieved.

14. Method for determining integrity and leak tightness of containers that are processed in a filling line, where said filling line comprises at least one centering head for at least one of holding, gripping or turning one of said containers, comprising conveying the container in a shaking manner at least until a resonance in said liquid is achieved, moving the centering head along a longitudinal axis of said container, determining a relative position of said centering head on said longitudinal axis, using the relative position of the centering head to determine integrity and leak tightness.

15. Method according to claim 14, and repeatedly determining the relative position of the centering head on the longitudinal axis during transport of the container.

16. Method according to claim 14, and drawing one or more conclusions from one of the relative position or an absolute height about at least one of the pressure increase in the container, the maximum possible reachable pressure in the container, the holding force of the centering head, the pressure drop in the container or the gradient of the pressure change in the container.

17. Method according to claim 14, and moving the centering head by a linear actuator.

18. Method according to claim 17, and in moving the centering head, the linear actuator is position controlled.

19. Method according to claim 14, and measuring information of a sensor contained in the centering head and in operative contact with the container.

* * * * *